US012334032B2

(12) United States Patent
Shi

(10) Patent No.: US 12,334,032 B2
(45) Date of Patent: Jun. 17, 2025

(54) GATE DRIVING CIRCUIT AND DISPLAY PANEL

(71) Applicant: TCL CHINA STAR OPTOELECTRONICS TECHNOLOGY CO., LTD., Shenzhen (CN)

(72) Inventor: Wenbo Shi, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/081,441

(22) Filed: Dec. 14, 2022

(65) Prior Publication Data

US 2024/0119913 A1 Apr. 11, 2024

(30) Foreign Application Priority Data

Oct. 10, 2022 (CN) ........................ 202211237916.X

(51) Int. Cl.
*G09G 3/36* (2006.01)
*G09G 3/32* (2016.01)
*G09G 3/3266* (2016.01)

(52) U.S. Cl.
CPC ............. *G09G 3/3677* (2013.01); *G09G 3/32* (2013.01); *G09G 3/3266* (2013.01); *G09G 2300/0426* (2013.01); *G09G 2310/0267* (2013.01)

(58) Field of Classification Search
CPC ...... G09G 3/3677; G09G 3/32; G09G 3/3266; G09G 2300/0426; G09G 2310/0267
See application file for complete search history.

(56) References Cited

U.S. PATENT DOCUMENTS 8,278,723 B2 * 10/2012 Kim .................... H01L 27/1288 257/618
2007/0296662 A1 * 12/2007 Lee ...................... G09G 3/3677 345/87
2010/0026669 A1 * 2/2010 Lee ...................... G09G 3/3677 257/E21.535
2011/0234577 A1 * 9/2011 Yang ...................... G11C 19/28 377/79
(Continued)

FOREIGN PATENT DOCUMENTS

CN 104599620 A 5/2015
CN 105632562 A 6/2016
(Continued)

OTHER PUBLICATIONS

Chinese Office Action issued in corresponding Chinese Patent Application No. 202211237916.X dated Apr. 14, 2025, pp. 1-7.

*Primary Examiner* — David Tung
(74) *Attorney, Agent, or Firm* — PV IP PC; Wei Te Chung

(57) ABSTRACT

A gate driving circuit and a display panel are provided. The gate driving circuit includes a plurality of gate driving units, and each of the gate driving units includes a first transistor and a second transistor. By setting a second size of the second transistor to be greater than a first size of the first transistor, not only the working stability of the second transistor is improved, but also the coupling of a potential of an output terminal of the first transistor to a potential of an output terminal of the second transistor can be reduced or avoided.

8 Claims, 5 Drawing Sheets

(56) References Cited

U.S. PATENT DOCUMENTS

| | | | | |
|---|---|---|---|---|
| 2012/0098800 | A1* | 4/2012 | Kim | G09G 3/3677 345/204 |
| 2014/0104152 | A1 | 4/2014 | Ma et al. | |
| 2014/0176410 | A1* | 6/2014 | Ma | G09G 3/3677 327/109 |
| 2014/0355732 | A1* | 12/2014 | Lin | G06F 3/041 377/64 |
| 2015/0255014 | A1* | 9/2015 | Lin | G09G 5/003 345/84 |
| 2016/0232866 | A1 | 8/2016 | Cho et al. | |
| 2018/0190228 | A1* | 7/2018 | Xu | G09G 3/36 |
| 2018/0336847 | A1* | 11/2018 | Chen | G11C 19/28 |
| 2019/0049768 | A1* | 2/2019 | Lv | G02F 1/13306 |
| 2020/0410914 | A1* | 12/2020 | Chen | G09G 3/3674 |
| 2023/0252951 | A1* | 8/2023 | Hara | H01L 27/1225 345/87 |

FOREIGN PATENT DOCUMENTS

| | | | |
|---|---|---|---|
| CN | 109147637 | A | 1/2019 |
| CN | 112951142 | A | 6/2021 |

* cited by examiner

GATE DRIVING CIRCUIT AND DISPLAY PANEL

CROSS-REFERENCE TO RELATED APPLICATIONS

This application claims priority to Chinese Patent Application No. 202211237916, filed on Oct. 10, 2022, the entire disclosure of which is incorporated herein by reference.

FIELD

The present disclosure relates to a field of display technologies, and particularly relates to a gate driving circuit and a display panel.

BACKGROUND

In gate driving circuits, an output terminal of a first transistor is generally connected to a control terminal of a second transistor to drive the second transistor to be turned on or off. However, due to a parasitic capacitance between a gate electrode of the second transistor and an output terminal of the second transistor, an potential of the output terminal of the first transistor, that is, a gate potential of the second transistor, will cause a coupling effect to a potential of the output terminal of the second transistor, thus affecting stability of the potential of the output terminal of the second transistor, and further affecting working stability or reliability of the gate driving circuit.

SUMMARY

The present disclosure provides a gate driving circuit and a display panel to relieve a technical problem of low working reliability of the gate driving circuit.

In a first aspect, a gate driving circuit is provided. The gate driving circuit includes a plurality of gate driving units, and each of the gate driving units includes a first transistor and a second transistor. One of a source electrode and a drain electrode of the first transistor is connected to a first transmission line, and a gate electrode of the first transistor is connected to a first control line. A gate electrode of the second transistor is connected to another one of the source electrode and the drain electrode of the first transistor, one of a source electrode and a drain electrode of the second transistor is connected to a second transmission line, and another one of the source electrode and the drain electrode of the second transistor is connected to an output line, wherein a first size of the first transistor is less than a second size of the second transistor.

In some embodiments, the second size is greater than or equal to 1.05 times the first size, and is less than or equal to 1.25 times the first size.

In some embodiments, the second size is equal to 1.1 times the first size.

In some embodiments, the output line is a cascade line or a scan line.

In some embodiments, each of the gate driving units further includes a third transistor, a gate electrode of the third transistor is connected to the another one of the source electrode and the drain electrode of the first transistor, one of a source electrode and a drain electrode of the third transistor is connected to the second transmission line, and another one of the source electrode and the drain electrode of the third transistor is connected to the cascade line or the scan line, wherein a third size of the third transistor is greater than the first size of the first transistor.

In some embodiments, the third size is greater than or equal to 1.05 times the first size, and is less than or equal to 1.25 times the first size.

In some embodiments, the third size is equal to 1.1 times the first size.

In some embodiments, the another one of the source electrode and the drain electrode of the second transistor is connected to the cascade line, the another one of the source electrode and the drain electrode of the third transistor is connected to the scan line, and the third size is greater than the second size.

In some embodiments, the output line is configured to transmit an output signal, the output signal comprises a first potential and a second potential, the first potential is higher than the second potential, and a gate potential of the second transistor in a conduction state is higher than the first potential.

In a second aspect, a display panel is provided, and the display panel includes a gate driving circuit in at least one of the above embodiments.

In the gate driving circuit and the display panel of the present disclosure, by setting the second size of the second transistor to be greater than the first size of the first transistor, compared with the first size of the first transistor, the second size of the second transistor is increased, which not only improves the working stability of the second transistor itself, but also limits the transmission performance of the first transistor through the first size, so as to reduce or avoid the coupling of a potential of an output terminal of the first transistor to a potential of an output terminal of the second transistor. And it is beneficial to stabilize the potential of the output terminal of the second transistor, thereby improving the working stability or reliability of the gate driving circuit.

DRAWINGS

Technical solutions and other beneficial effects of the present disclosure will be apparent through the detailed description of the specific embodiments of the present disclosure in conjunction with the accompanying drawings.

DETAILED DESCRIPTION

The technical solutions in the embodiments of the present disclosure will be described clearly and completely hereafter with reference to the accompanying drawings. Apparently, the described embodiments are only a part of but not all embodiments of the present disclosure. All other embodiments obtained by persons of ordinary skill in the art based on the embodiments of the present disclosure without creative efforts shall fall within the protection scope of the present disclosure.

Figure 1:
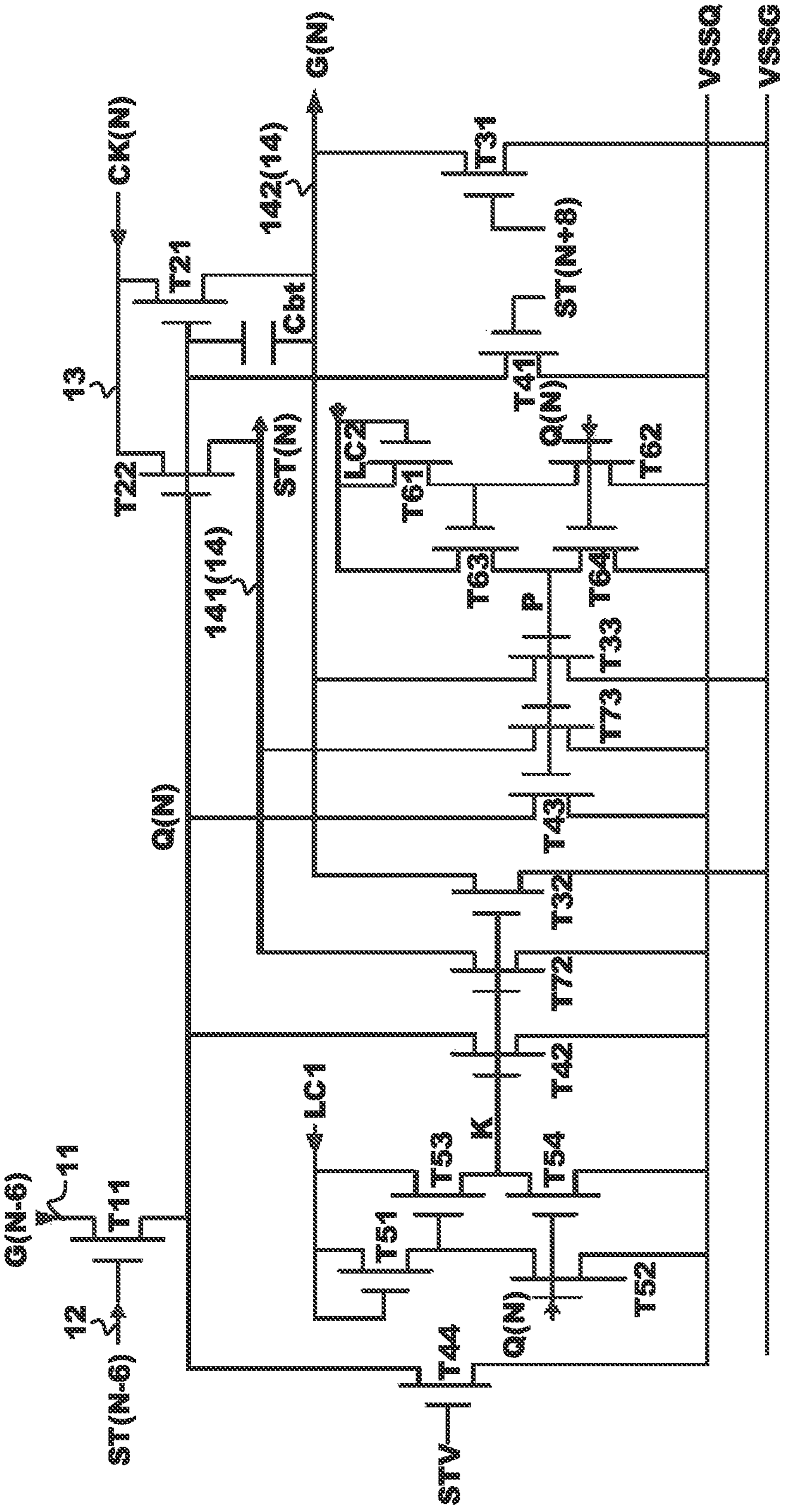
FIG. 1 is a schematic diagram of a gate driving circuit provided by an embodiment of the present disclosure.
Figure 2:
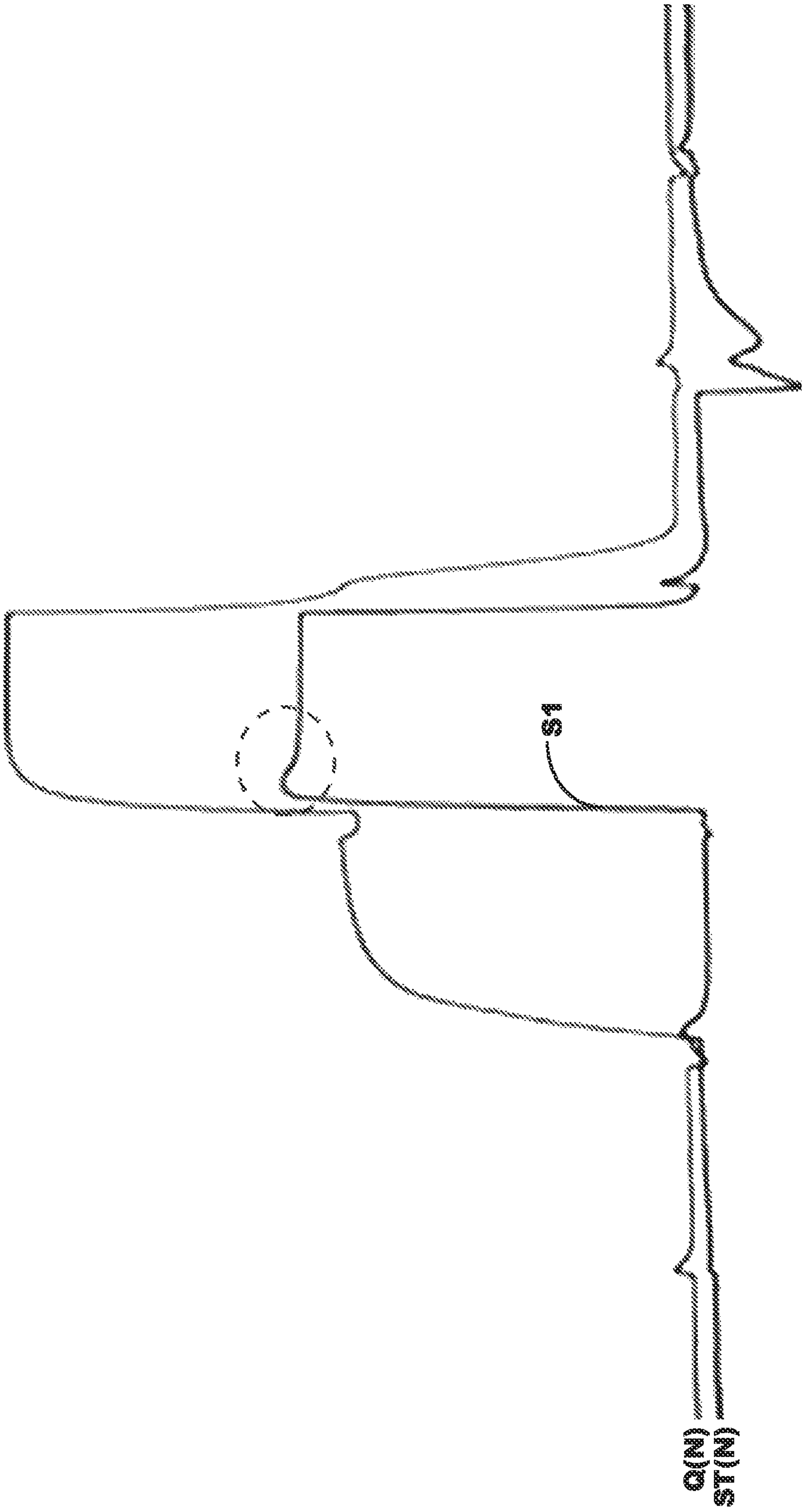
FIG. 2 is a schematic diagram of waveforms of Q(N) and ST(N) shown in FIG. 1 before improvement.
Figure 3:
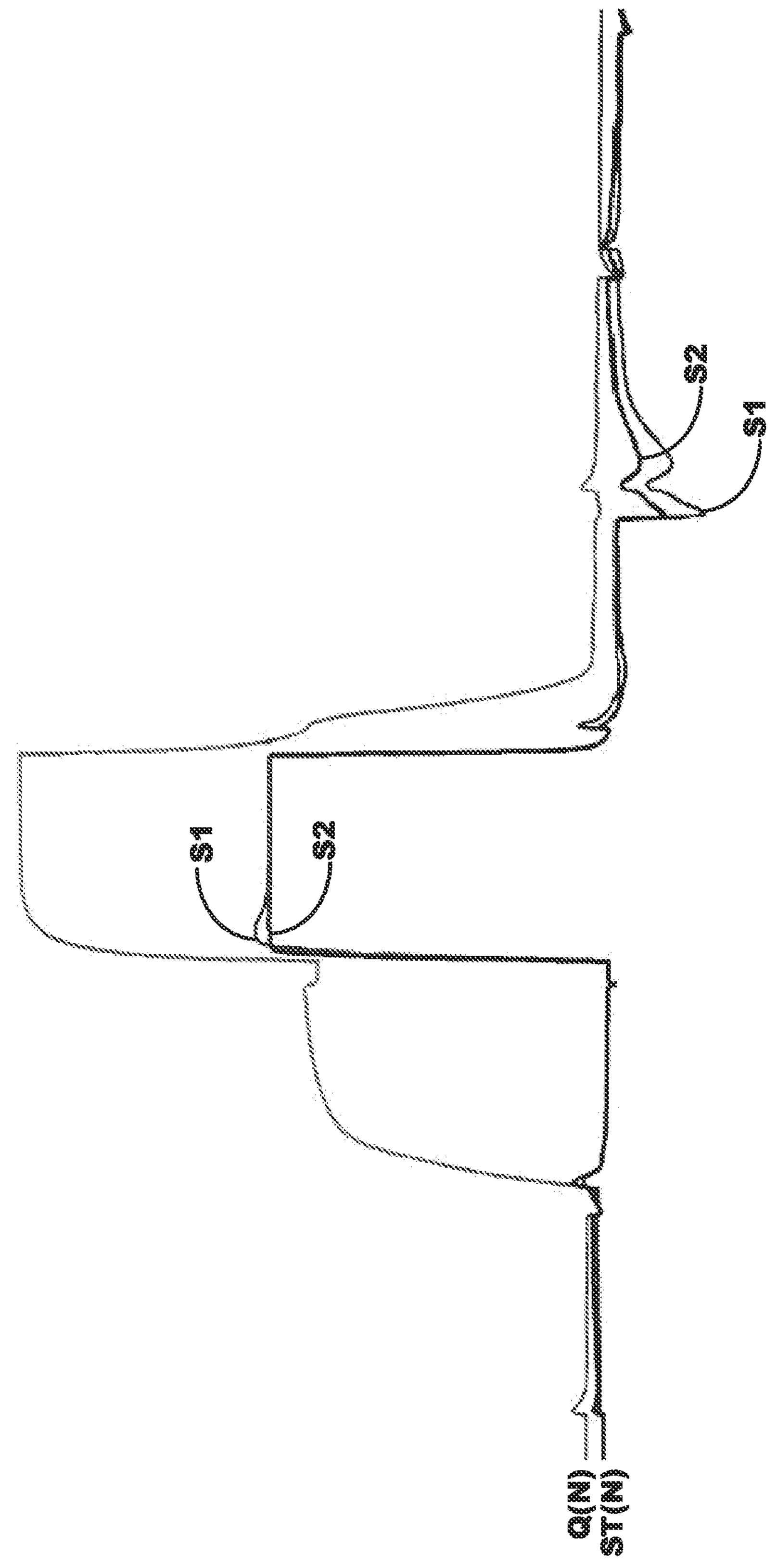
FIG. 3 is a schematic diagram of waveforms of Q(N) and ST(N) shown in FIG. 1 before improvement and after improvement.
Figure 4:
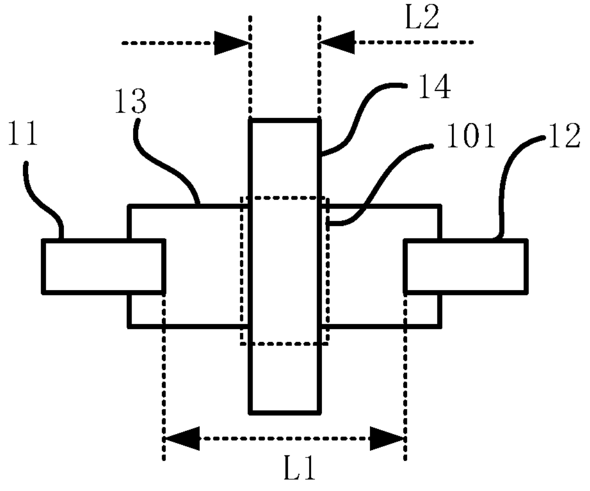
Figure 5:
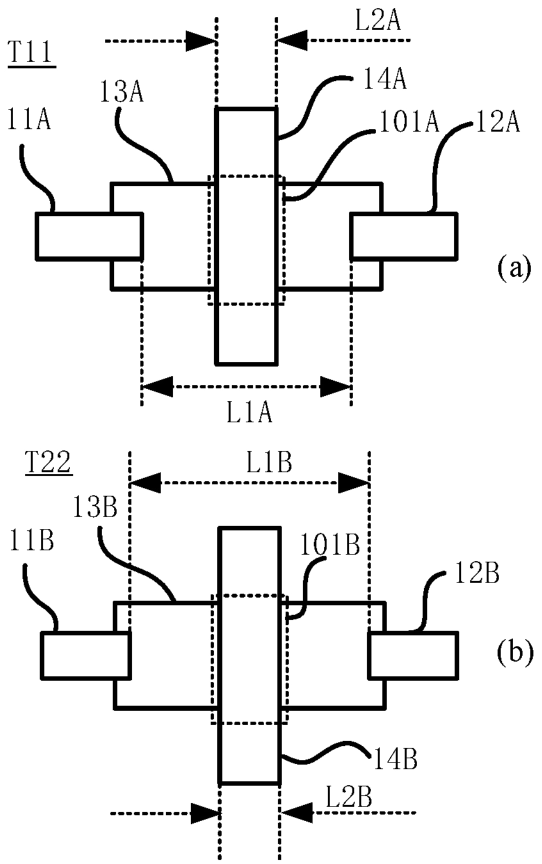
Figure 6:
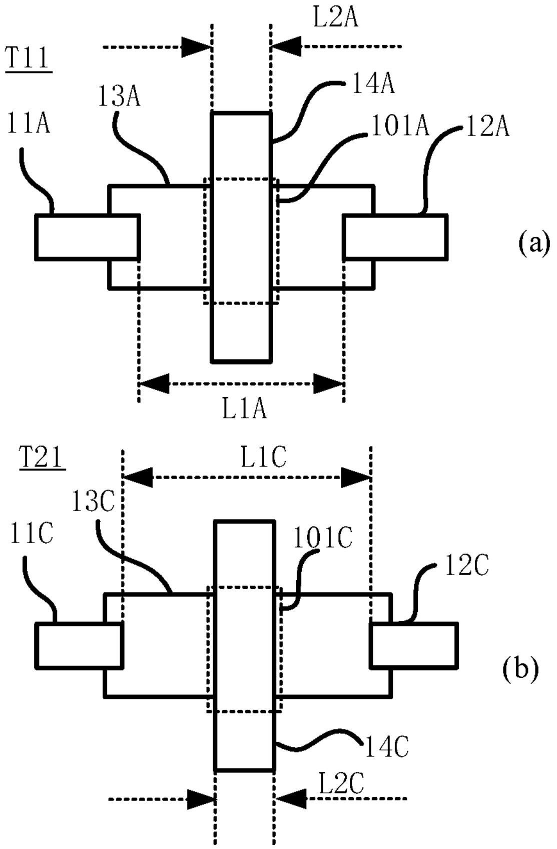

In view of the technical problem of a low working reliability of the gate driving circuit mentioned above, a gate driving circuit is provided in the embodiment. Referring to FIG. 1 to FIG. 3, as shown in FIG. 1, the gate driving circuit includes a plurality of gate driving units, and each of the gate driving units includes a first transistor T11 and a second transistor T22. One of a source electrode and a drain electrode of the first transistor T11 is connected to a first transmission line 11, and a gate electrode of the first transistor T11 is connected to a first control line 12. A gate electrode of the second transistor T22 is connected to another one of the source electrode and the drain electrode of the first transistor T11, one of a source electrode and a drain electrode of the second transistor T22 is connected to a second transmission line 13, and another one of the source electrode and the drain electrode of the second transistor 122 is connected to an output line 14. Wherein a first size of the first transistor T11 is less than a second size of the second transistor T22.

It can be understood that, in the gate driving circuit, by setting the second size of the second transistor 122 to be greater than the first size of the first transistor T11, compared with the first size of the first transistor T11, the second size of the second transistor T22 is increased. Thus, not only the working stability of the second transistor T22 is improved, but also the transmission performance of the first transistor T11 can be limited through the first size, so as to reduce or avoid the coupling of a potential of an output terminal of the first transistor T11 to a potential of an output terminal of the second transistor T22. And it is beneficial to stabilize the potential of the output terminal of the second transistor 122, thereby improving the working stability or reliability of the gate driving circuit.

In an embodiment, the output line 14 is a cascade line 141 or a scan line 142.

It should be noted that, whether the another one of the source electrode and the drain electrode of the second transistor T22 is connected to the cascade line 141 or is connected to the scan line 142, the working stability of the gate driving circuit can be improved.

It should be noted that, the output line 14 may be a cascade line 141 or a scan line 142. Wherein the cascade line 141 is configured to transmit an Nth level cascade signal ST(N), and the scan line 142 is configured to transmit an Nth level scan signal G(N).

The first transmission line 11 can be configured to transmit a first transmission signal, and the first transmission signal may be a direct current signal or a square wave signal. The square wave signal may be one of other scan signals whose phases are earlier than a phase of the Nth level scan signal G(N) in one frame. Such as an N−1th level scan signal, a N−6th level scan signal G(N−6), or an N−9th level scan signal . . . etc. Among them, waveforms of different level scan signals are same, and phases of the different level scan signals are different.

The first control line 12 can be configured to transmit a first control signal, and the first control line 12 may also be a square wave signal. The square wave signal may be one of other cascade signals whose phases are earlier than a phase of the Nth level cascade signal ST(N) in one frame. Such as an N−1th level cascade signal, an N−6th level cascade signal ST(N−6), or an N−9th level cascade signal . . . etc. Among them, waveforms of different level cascade signals are same, and phases of the different level scan signals are different.

The second transmission line 13 can be configured to transmit a second transmission signal, the second transmission signal may be a direct current signal or a clock signal, and the clock signal may specifically be an Nth level clock signal CK(N). Among them, waveforms of different level clock signals are same, and phases of the different level clock signals are different.

In an embodiment, the second size is greater than or equal to 1.05 times the first size, and is less than or equal to 1.25 times the first size.

It should be noted that, a proportional relationship is configured between the first size and the second size in the embodiment, which can minimize an adverse effect on a potential of an output terminal of the second transistor T22 with an appropriate size. Not only an occupied space of the gate driving circuit is reduced, but also the stability of the gate driving circuit is improved.

Wherein by increasing the second size of the second transistor T22, a positional relationship between the gate electrode and the output terminal of the second transistor T22 can be configured more flexibly, and the output terminal is the source electrode and the drain electrode. For example, a smaller overlapping area between the gate electrode of the second transistor T22 and the source electrode or the drain electrode of the second transistor T22 can be configured in a thickness direction of the gate driving circuit, and even the smaller overlapping area can be zero. So as to reduce a parasitic capacitance between the gate electrode of the second transistor T22 and the source electrode or the drain electrode of the second transistor 122.

In an embodiment, the second size is equal to 1.1 times the first size.

It should be noted that, the second size is configured to be equal to 1.1 times the first size in the embodiment, which can minimize the adverse effect on the potential of the output terminal of the second transistor T22 with an appropriate size. Not only the occupied space of the gate driving circuit is reduced, but also the stability of the gate driving circuit is improved.

In an embodiment, each of the gate driving units further includes a third transistor T21, a gate electrode of the third transistor T21 is connected to the another one of the source electrode and the drain electrode of the first transistor T11, one of a source electrode and a drain electrode of the third transistor T21 is connected to the second transmission line 13, and another one of the source electrode and the drain electrode of the third transistor T21 is connected to the cascade line 141 or the scan line 142. Wherein a third size of the third transistor T21 is greater than the first size of the first transistor T11.

It should be noted that, in the gate driving circuit, by setting the third size of the third transistor T21 to be greater than the first size of the first transistor T11, compared with the first size of the first transistor T11, the third size of the third transistor T21 is increased, which not only improves the working stability of the third transistor 121 itself, but also limits the transmission performance of the first transistor T11 through the first size, so as to reduce or avoid the coupling of the potential of the output terminal of the first transistor T11 to a potential of an output terminal of the third transistor T21. And it is beneficial to stabilize the potential of the output terminal of the third transistor, thereby improving the working stability or reliability of the gate driving circuit.

In an embodiment, the third size is greater than or equal to 1.05 times the first size, and is less than or equal to 1.25 times the first size.

It should be noted that, a proportional relationship is configured between the first size and the third size in the embodiment, which can minimize an adverse effect on a potential of an output terminal of the third transistor T21 with an appropriate size. Not only an occupied space of the gate driving circuit is reduced, but also the stability of the gate driving circuit is improved.

Wherein by increasing the third size of the third transistor T21, a positional relationship between the gate electrode and the output terminal of the third transistor T21 can be configured more flexibly, and the output terminal is the source electrode and the drain electrode. For example, a smaller overlapping area between the gate electrode of the third transistor T21 and the source electrode or the drain electrode of the third transistor T21 can be configured in a thickness direction of the gate driving circuit, and even the smaller overlapping area can be zero. So as to reduce a parasitic capacitance between the gate electrode of the third transistor T21 and the source electrode or the drain electrode of the third transistor T21.

In an embodiment, the third size is equal to 1.1 times the first size.

It should be noted that, the third size is configured to be equal to 1.1 times the first size in the embodiment, which can minimize the adverse effect on the potential of the output terminal of the third transistor T21 with an appropriate size. Not only the occupied space of the gate driving circuit is reduced, but also the stability of the gate driving circuit is improved.

In an embodiment, the another one of the source electrode and the drain electrode of the second transistor T22 is connected to the cascade line 141, the another one of the source electrode and the drain electrode of the third transistor T21 is connected to the scan line 142, and the third size is greater than the second size.

It should be noted that, compared with the second transistor T22, the third transistor T21 connected to the scan line 142 needs to go through a longer path for to output a corresponding scan signal to a display panel, and the third transistor T21 needs to drive more loads. Therefore, a configuration of the third transistor T21 with a greater size than a size of the second transistor T22 is also beneficial to improve a load-carrying capability of the scan signal output by the third transistor T21, which further stabilizes the working stability or the reliability of the display panel.

In an embodiment, the gate driving unit further includes a transistor T44. One of a source electrode and a drain electrode of the transistor T44 is connected to the another one of the source electrode and the drain electrode of the first transistor T11 and a first node Q(N), another one of the source electrode and the drain electrode of the transistor T44 is connected to a first low potential line, and a gate electrode of a transistor 32 is connected to a start line.

It should be noted that, the first low potential line is configured to transmit a first low potential signal VSSQ. The start line is configured to transmit a start signal STV, and the start signal STV can inhibit the gate driving circuit from providing an output signal with pulses in a blank period of each frame.

In an embodiment, the gate driving unit further includes a first inversion module, and the first inversion module is connected to the first node Q(N) and a second node K.

It should be noted that, in the embodiment, when a potential of the first node Q(N) is a high potential, a potential of the second node K is a low potential, and when the potential of the first node Q(N) is a low potential, the potential of the second node K is a high potential.

In an embodiment, the first inversion module includes a transistor T51, a transistor T52, a transistor T53, and a transistor T54. One of a source electrode and a drain electrode of the transistor T51 is connected to one of a source electrode and a drain electrode of the transistor T53, a second control line, and a gate electrode of the transistor T51. Another one of the source electrode and the drain electrode of the transistor T51 is connected to a gate electrode of the transistor T53 and one of a source electrode and a drain electrode of the transistor T52. Another one of the source electrode and the drain electrode of the transistor T53 is connected to the second node K, the gate electrode of the transistor 32, and one of a source electrode and a drain electrode of the transistor T54. The first low potential line is connected to another one of the source electrode and the drain electrode of the transistor T52, and another one of the source electrode and the drain electrode of the transistor T54. The first node Q(N) is connected to a gate electrode of the transistor T52 and a gate electrode of the transistor T54.

Wherein the second control line is configured to transmit a second control signal, and the second control signal is a low frequency control signal LC1.

In an embodiment, the gate driving unit further includes a transistor T42. One of a source electrode and a drain electrode of the transistor T42 is connected to the first node Q(N), another one of the source electrode and the drain electrode of the transistor T42 is connected to the first low potential line, and a gate electrode of the transistor T42 is connected to the second node K.

In an embodiment, the gate driving unit further includes a transistor T72. One of a source electrode and a drain electrode of the transistor T72 is connected to the another one of the source electrode and the drain electrode of the second transistor T22 and the cascade line 141, another one of the source electrode and the drain electrode of the transistor T72 is connected is connected to the first low potential line, a gate electrode of the transistor T72 is connected to the second node K.

In an embodiment, the gate driving unit further includes the transistor T32. One of a source electrode and a drain electrode of the transistor T32 is connected to the another one of the source electrode and the drain electrode of the third transistor T21 and the scan line 142, another one of the source electrode and the drain electrode of the transistor T32 is connected to a second low potential line, and the gate electrode of the transistor T32 is connected to the second node K.

It should be noted that, the second low potential line is configured to transmit a second low potential signal VSSG.

In an embodiment, the gate driving unit further includes a capacitor Cbt, one end of the capacitor Cbt is connected to the first node Q(N), and another one end of the capacitor Cbt is connected to the scan line 142.

In an embodiment, the gate driving unit further includes a second inversion module, and the second inversion module is connected to the first node Q(N) and a third node P.

It should be noted that, in the embodiment, when a potential of the first node Q(N) is a high potential, a potential of the third node P is a low potential, and when the potential of the first node Q(N) is a low potential, the potential of the third node P is a high potential.

In an embodiment, the second inversion module includes a transistor T61, a transistor T62, a transistor T63, and a transistor T64. One of a source electrode and a drain electrode of the transistor T61 is connected to one of a source electrode and a drain electrode of the transistor T63, a third control line, and a gate electrode of the transistor T61. Another one of the source electrode and the drain electrode of the transistor T61 is connected to a gate electrode of the transistor T63 and one of a source electrode and a drain electrode of the transistor T62. Another one of the source electrode and the drain electrode of the transistor T63 is connected to the third node P and one of a source electrode and a drain electrode of the transistor T64. The first low potential line is connected to another one of the source electrode and the drain electrode of the transistor T62 and another one of the source electrode and the drain electrode of the transistor T64. The first node Q(N) is connected to a gate electrode of the transistor T62 and a gate electrode of the transistor T64.

Wherein the third control line is configured to transmit a third control signal, and the third control signal is a low frequency control signal LC2. When a potential of the second control signal is a low potential, a potential of the third control signal is a high potential, and when the potential of the second control signal is a high potential, the potential of the third control signal is a low potential.

In an embodiment, the gate driving unit further includes a transistor T43. One of a source electrode and a drain electrode of the transistor T43 is connected to the first node Q(N), another one of the source electrode and the drain electrode of the transistor T43 is connected to the first low potential line, and a gate electrode of the transistor T43 is connected to the third node P.

In an embodiment, the gate driving unit further includes a transistor T73. One of a source electrode and a drain electrode of the transistor T73 is connected to the cascade line 141, another one of the source electrode and the drain electrode of the transistor 173 is connected to the first low potential line, and a gate electrode of the transistor T73 is connected to the third node P.

In an embodiment, the gate driving unit further includes a transistor T33. One of a source electrode and a drain electrode of the transistor T33 is connected to the scan line 142, another one of the source electrode and the drain electrode of the transistor T33 is connected to the second low potential line, and a gate electrode of the transistor T33 is connected to the third node P.

In an embodiment, the gate driving unit further includes a transistor T41. One of a source electrode and a drain electrode of the transistor T41 is connected to the first node Q(N), another one of the source electrode and the drain electrode of the transistor T41 is connected to the first low potential line, and a gate electrode of the transistor T41 is connected to a fourth control line.

It should be noted that, the fourth control line is configured to transmit a forth control signal, and the fourth control signal may be a N+8th level cascade signal ST(N+8).

In an embodiment, the gate driving unit further includes a transistor T31. One of a source electrode and a drain electrode of the transistor T31 is connected to the scan line 142, another one of the source electrode and the drain electrode of the transistor T31 is connected to the second low potential line, and a gate electrode of the transistor T31 is connected to the fourth control line.

In an embodiment, the above transistors may be N-channel thin film transistors. Specifically, the above transistors may be N-channel metal oxide thin film transistors. Preferably, the above transistors may be N-channel indium gallium zinc oxide thin film transistors.

In an embodiment, the above transistors may be P-channel thin film transistors. Specifically, the above transistors may be P-channel polysilicon thin film transistors. Preferably, the above transistors may be P-channel low temperature polysilicon thin film transistors.

FIG. 2 is a schematic view of waveforms of Q(N) and ST(N) shown in FIG. 1 before improvement. FIG. 3 is a schematic view of waveforms of Q(N) and ST(N) shown in FIG. 1 before improvement and after improvement. Referring to FIG. 2 and FIG. 3, the Q(N) is also a gate potential of the second transistor T22, and a curve S1 represents a potential change trend of the Nth level cascaded signal ST(N). As shown in the dotted box in FIG. 2, when the gate potential of the second transistor T22 jumps to a highest potential, due to a capacitance between the gate electrode of the second transistor T22 and the source electrode or the drain electrode of the second transistor T22, the potential of the Nth level cascaded signal ST(N) will be coupled up. In addition, when the Nth level cascade signal ST(N) is at a low potential, it is coupled by a Nth level clock signal CK(N) transmitted by the second transmission line 13, resulting in changes such as glitches.

Referring to FIG. 3, a curve S2 in FIG. 3 is a potential change trend of the Nth level cascaded signal ST(N) after a size of the second transistor T22 is increased. Compared with the curve S1, because the size of the second transistor T22 is increased to improve the working stability of itself, even when the gate potential of the second transistor T22 jumps to the highest potential, the Nth level cascade signal ST(N) is also not coupled up. In addition, even when the Nth level cascade signal ST(N) is at a low potential, a potential variation width of the Nth level cascade signal ST(N) will be reduced.

Wherein the output line 14 is configured to transmit an output signal, the output signal 14 includes a first potential and a second potential, the first potential is higher than the second potential, and a gate potential of the second transistor in a conduction state is higher than the first potential.

It should be noted that, after the size of the second transistor T22 is increased, even if a potential of the another one of the source electrode and the drain electrode of the first transistor T11 is much higher than the potential of the Nth level cascade signal ST(N), the second transistor T22 can maintain stable output without being affected.

In an embodiment, a display panel is provided, and the display panel includes the gate driving circuit in at least one of the embodiments.

It can be understood that, in the display panel of the embodiments, by setting the second size of the second transistor T22 to be greater than the first size of the first transistor T11, compared with the first size of the first transistor T11, the second size of the second transistor T22 is increased, which not only improves the working stability of the second transistor T22 itself, but also limits the transmission performance of the first transistor T11 through the first size, so as to reduce or avoid the coupling of a potential of an output terminal of the first transistor T11 to a potential of an output terminal of the second transistor T22. And it is beneficial to stabilize the potential of the output terminal of the second transistor T22, thereby improving the working stability or reliability of the gate driving circuit.

It should be noted that, the display panel may be a liquid crystal display panel, and the display panel may be a self-luminous display panel, such as an organic light-emitting display panel, a mini light-emitting display panel, or a quantum dot light-emitting display panel.

In the foregoing embodiments, the description of each of the embodiments has respective focuses. For a part that is not described in detail in an embodiment, reference may be made to relevant descriptions in other embodiments.

The gate driving circuit and the display panel of the present disclosure are described in detail above. The principle and implementations of the present disclosure are described in this specification by using specific examples. The description about the foregoing embodiments is merely provided to help understand the method and core ideas of the present disclosure. Persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A gate driving circuit, wherein the gate driving circuit comprises a plurality of gate driving units, and each of the gate driving units comprises:

a first transistor, one of a source and a drain of the first transistor being connected to a first transmission line, another one of the source and the drain of the first transistor being connected to a first node, a gate of the first transistor being connected to a first control line, and the first control line being configured to transmit an (N−6)-th level cascade signal; and a second transistor, a gate of the second transistor being connected to the first node, one of a source and a drain of the second transistor being connected to a second transmission line, another one of the source and the drain of the second transistor being connected to a cascade line, and the cascade line being configured to output a N-th level cascade signal;

wherein each of the gate driving units further comprises a first inversion module comprising a third transistor, a fourth transistor, a fifth transistor and a sixth transistor, a seventh transistor, and an eighth transistor;

one of a source and a drain of the third transistor is connected to one of a source and a drain of the fifth transistor, a second control line, and a gate of the third transistor; another one of the source and the drain of the third transistor is connected to a gate of the fifth transistor and one of a source and a drain of the fourth transistor; another one of the source and the drain of the fifth transistor, one of the a source and a drain of the sixth transistor, and a gate of the seventh transistor are connected to a second node; another one of the source and the drain of the fourth transistor, another one of the source and the drain of the sixth transistor, and one of a source and a drain of the seventh transistor are connected to a first low potential line; and a gate of the fourth transistor, a gate of the sixth transistor, and another one of the source and the drain of the seventh transistor are connected to the first node;

one of a source and a drain of the eighth transistor is connected to another one of the source and the drain of the second transistor, another one of the source and the drain of the eighth transistor is connected to the first low potential line, and a gate of the eighth transistor is connected to the second node;

each of the gate driving units further comprises a ninth transistor, a tenth transistor, and an eleventh transistor;

a gate of the ninth transistor is connected to the another one of the source and the drain of the first transistor, one of a source and a drain of the ninth transistor is connected to the second transmission line, another one of the source and the drain of the ninth transistor is connected to a scan line, and the scan line is configured to transmit a N-th level scan signal;

a gate of the tenth transistor and a gate of the eleventh transistor are connected to a third control line, and the third control line is configured to transmit a (N+8)-th level cascade signal;

one of a source and a drain of the tenth transistor is connected to the first node, and another one of the source and the drain of the tenth transistor is connected to the first low potential line; and one of a source and a drain of the eleventh transistor is connected to the scan line, and another one of the source and the drain of the eleventh transistor is connected to a second low potential line.

2. The gate driving circuit according to claim 1, wherein each of the gate driving units further comprises a second inversion module, the second inversion module comprises a twelfth transistor, an thirteenth transistor, a fourteenth transistor, and a fifteenth transistor;

one of a source and a drain of the twelfth transistor is connected to one of a source and a drain of the fourteenth transistor, a third control line, and a gate of the twelfth transistor, another one of the source and the drain of the twelfth transistor is connected to a gate of the fourteenth transistor and one of a source and a drain of the thirteenth transistor, and another one of the source and the drain of the fourteenth transistor is connected to a third node P, one of a source and a drain of the fifteenth transistor;

the first low potential line is connected to another one of the source and the drain of the thirteenth transistor, another one of the source and the drain of the fifteenth transistor; and the first node is connected to a gate of the thirteenth transistor and a gate of the fifteenth transistor.

3. The gate driving circuit according to claim 2, wherein each of the gate driving units further comprises a sixteenth transistor, one of the source and the drain of the sixteenth transistor is connected to the first node, another one of the source and the drain of the sixteenth transistor is connected to the first low potential line, and a gate of the sixteenth transistor is connected to the third node.

4. The gate driving circuit according to claim 2, wherein each of the gate driving units further comprises a seventeenth transistor, one of a source and a drain of the seventeenth transistor is connected to a cascade line, another one of the source and the drain of the seventeenth transistor is connected to the first low potential line, and a gate of the seventeenth transistor is connected to the third node.

5. The gate driving circuit according to claim 4, wherein each of the gate driving units further comprises a eighteenth transistor, one of a source and a drain of the eighteenth transistor is connected to a scan line, another one of the source and the drain of the eighteenth transistor is connected to a second low potential line, and a gate of the eighteenth transistor is connected to the third node.

6. A display panel comprising a gate driving circuit, wherein the gate driving circuit comprises a plurality of gate driving units, and each of the gate driving units comprises:

a first transistor, one of a source and a drain of the first transistor being connected to a first transmission line, another one of the source and the drain of the first transistor being connected to a first node, a gate of the first transistor being connected to a first control line, and the first control line being configured to transmit an (N−6)-th level cascade signal; and a second transistor, a gate of the second transistor being connected to the first node, one of a source and a drain of the second transistor being connected to a second transmission line, another one of the source and the drain of the second transistor being connected to a cascade line, and the cascade line being configured to output a N-th level cascade signal;

wherein each of the gate driving units further comprises a first inversion module comprising a third transistor, a fourth transistor, a fifth transistor and a sixth transistor, a seventh transistor, and an eighth transistor;

one of a source and a drain of the third transistor is connected to one of a source and a drain of the fifth transistor, a second control line, and a gate of the third transistor; another one of the source and the drain of the third transistor is connected to a gate of the fifth transistor and one of a source and a drain of the fourth transistor; another one of the source and the drain of the fifth transistor, one of the a source and a drain of the sixth transistor, and a gate of the seventh transistor are connected to a second node; another one of the source and the drain of the fourth transistor, another one of the source and the drain of the sixth transistor, and one of a source and a drain of the seventh transistor are connected to a first low potential line; and a gate of the fourth transistor, a gate of the sixth transistor, and another one of the source and the drain of the seventh transistor are connected to the first node;

one of a source and a drain of the eighth transistor is connected to another one of the source and the drain of the second transistor, another one of the source and the drain of the eighth transistor is connected to the first low potential line, and a gate of the eighth transistor is connected to the second node;

each of the gate driving units further comprises a ninth transistor, a tenth transistor, and an eleventh transistor;

a gate of the ninth transistor is connected to the another one of the source and the drain of the first transistor, one of a source and a drain of the ninth transistor is connected to the second transmission line, another one of the source and the drain of the ninth transistor is connected to a scan line, and the scan line is configured to transmit a N-th level scan signal;

a gate of the tenth transistor and a gate of the eleventh transistor are connected to a third control line, and the third control line is configured to transmit a (N+8)-th level cascade signal;

one of a source and a drain of the tenth transistor is connected to the first node, and another one of the source and the drain of the tenth transistor is connected to the first low potential line; and one of a source and a drain of the eleventh transistor is connected to the scan line, and another one of the source and the drain of the eleventh transistor is connected to a second low potential line.

7. The display panel according to claim 6, wherein the display panel comprises at least one of a liquid crystal display panel and a self-luminous display panel.

8. The display panel according to claim 7, wherein the self-luminous display panel comprises at least one of an organic light-emitting display panel, a mini light-emitting display panel, and a quantum dot light-emitting display panel.

* * * * *